June 12, 1934. S. E. BOUCHARD 1,962,802
OPHTHALMIC MOUNTING
Filed March 29, 1930

Samuel E. Bouchard
INVENTOR

BY G. A. Ellestad
ATTORNEY

Patented June 12, 1934

1,962,802

UNITED STATES PATENT OFFICE 1,962,802

OPHTHALMIC MOUNTING

Samuel E. Bouchard, Rochester, N. Y., assignor to Bausch & Lomb Optical Company, Rochester, N. Y., a corporation of New York Application March 29, 1930, Serial No. 439,997

3 Claims. (Cl. 88—42)

This invention relates to ophthalmic mountings and more particularly it has reference to connection means whereby the parts of the mounting may be assembled and held together.

In certain types of ophthalmic mountings, such as that disclosed in U. S. Letters Patent No. 833,289 issued to E. C. Bernheim on October 16, 1906, for example, the ends of the bridge and the pad arms are held in box studs by means of screws. Through constant use these screws usually get loose so that the structure becomes wobbly and does not properly fit the face.

One of the objects of my invention is to provide a simple, yet efficient, means for connecting parts of an ophthalmic mounting. Another object is to provide a screwless connecting means for uniting parts of an ophthalmic mounting. Still another object is to provide an improved means whereby the bridge of an ophthalmic mounting may be detachably secured to lens holding members. These and other objects of my invention reside in certain novel features of construction, arrangement and combination of parts as will hereinafter be more fully explained and pointed out in the appended claims.

Referring to the drawing.

Figure 1:
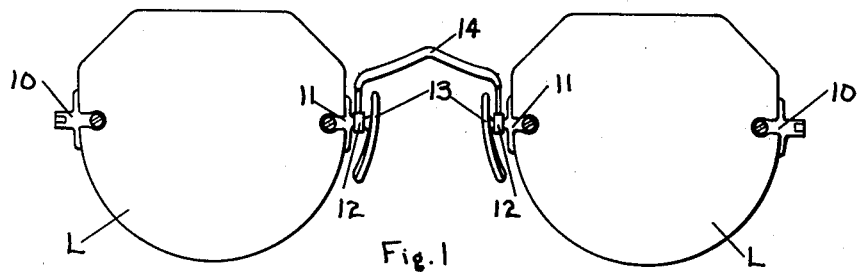
Fig. 1 shows a front view of a pair of spectacles embodying my invention.
Figure 2:
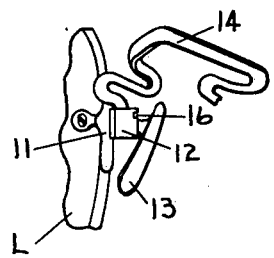
Fig. 2 is a fragmentary perspective view showing my improved connecting means.

A preferred form of my invention is shown in the drawing wherein it is illustrated as embodied in a pair of spectacles comprising the lenses L having the usual end pieces 10 which are adapted to carry suitable temples, not shown. Suitable lens holding members, such as straps 11, have the box studs 12 soldered thereto. The arms of the pads 13 are also suitably secured to the lens holding straps 11 by solder, for example. The bridge 14 has its ends 15 secured in the box studs 12, as will presently be described.

Figure 3:
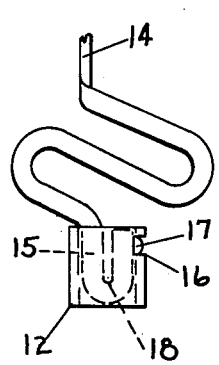
Fig. 3 is an enlarged fragmentary side elevation showing my connecting means.
Figure 4:
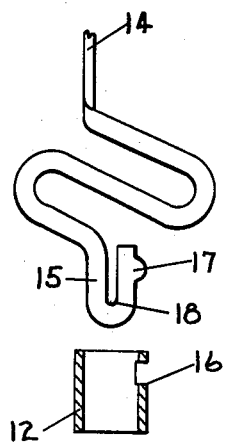
Fig. 4 is a separated view of the same showing the box stud in section.

The box stud 12, which is preferably made of rectangular tubing, has an aperture 16 formed in its rear wall. The end 15 of the bridge 14 is provided with an integral projection or lug 17 and the end of the bridge may be reversely bent as at 18 so as to render it yieldable. In assembling the mounting, the end of the bridge is merely forced down into the box stud 12 until the projection 17 snaps into the aperture 16, as shown in Fig. 3.

Since the end of the bridge is yieldable, the projection 17 remains secure in the aperture 16 and can only be released by pressing inwardly on the projection with any suitable tool. The ends of the bridge fit snugly within the box stud so that a tight and secure connection is provided. The connection can obviously be assembled or taken apart merely by engaging or disengaging the projection 17 with the aperture 16.

Although I have shown my invention as used with rimless spectacles, it is obvious that it may be applied equally well to spectacles having eye wires or rims. My invention can obviously be applied to various types of bridges or other parts of ophthalmic mountings. From the foregoing it will be apparent that I am able to attain the objects of my invention and provide an improved means for connecting parts of ophthalmic mountings without the use of screws. Various modifications can obviously be made without departing from the spirit of my invention.

I claim:

1. An ophthalmic mounting comprising lens holding means, a tubular member secured to said means, said tubular member having an aperture in its wall, a bridge having a reversely bent end portion, said end portion having an integral projection adjacent to its extremity, said end portion being detachably secured within said tubular member with said projection positioned in said aperture.

2. An ophthalmic mounting comprising lens holding means, a tubular member secured to said means, said member having an aperture in its wall, a bridge having spaced resilient end portions one of which is provided with a projection, said end portions being positioned in said tubular member, said projecting being positioned in said aperture and retained therein solely by the resiliency of said portions.

3. An ophthalmic mounting comprising lens holding means, a tubular member secured to said means, said member having an aperture in its wall, a bridge having spaced end portions, one of said portions being resilient and being provided with an integral projection, said portions being positioned in said member with said projection positioned in said aperture and yieldably held therein by the resiliency of the portion.

SAMUEL E. BOUCHARD.